D. M. RAICHE.
HYDROTEMPERATURE CONTROL SYSTEM FOR BATHS AND LAVING PURPOSES.
APPLICATION FILED APR. 29, 1920.
1,381,012.
Patented June 7, 1921.
3 SHEETS—SHEET 3.
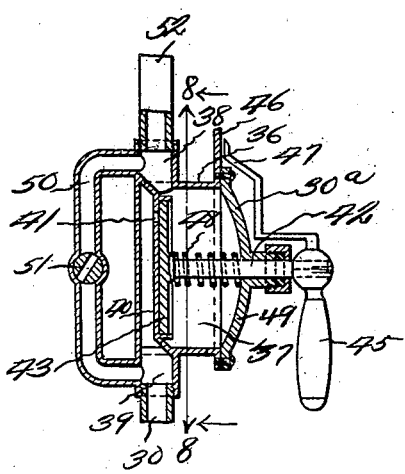
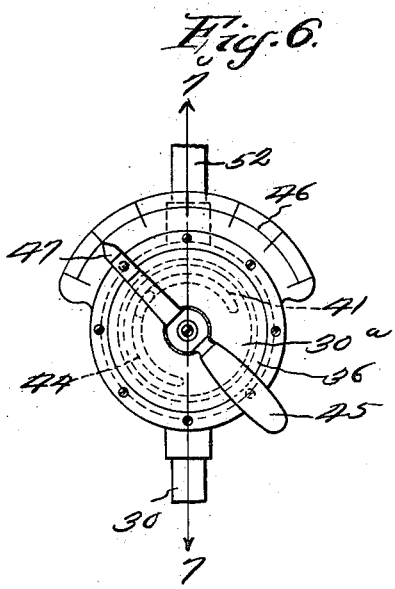
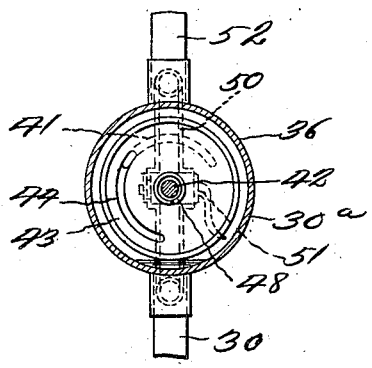
Inventor
D. M. Raiche.
By D. Swift
Attorney

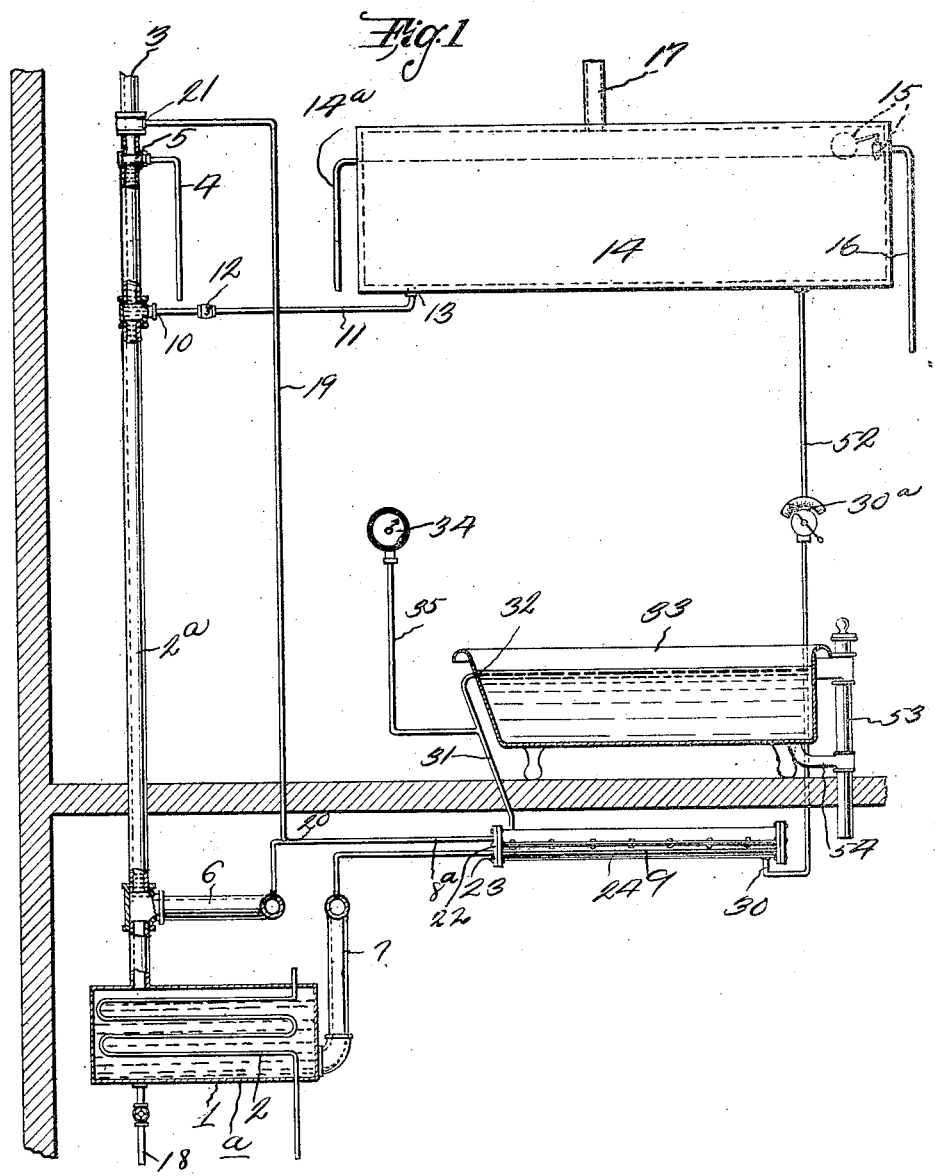

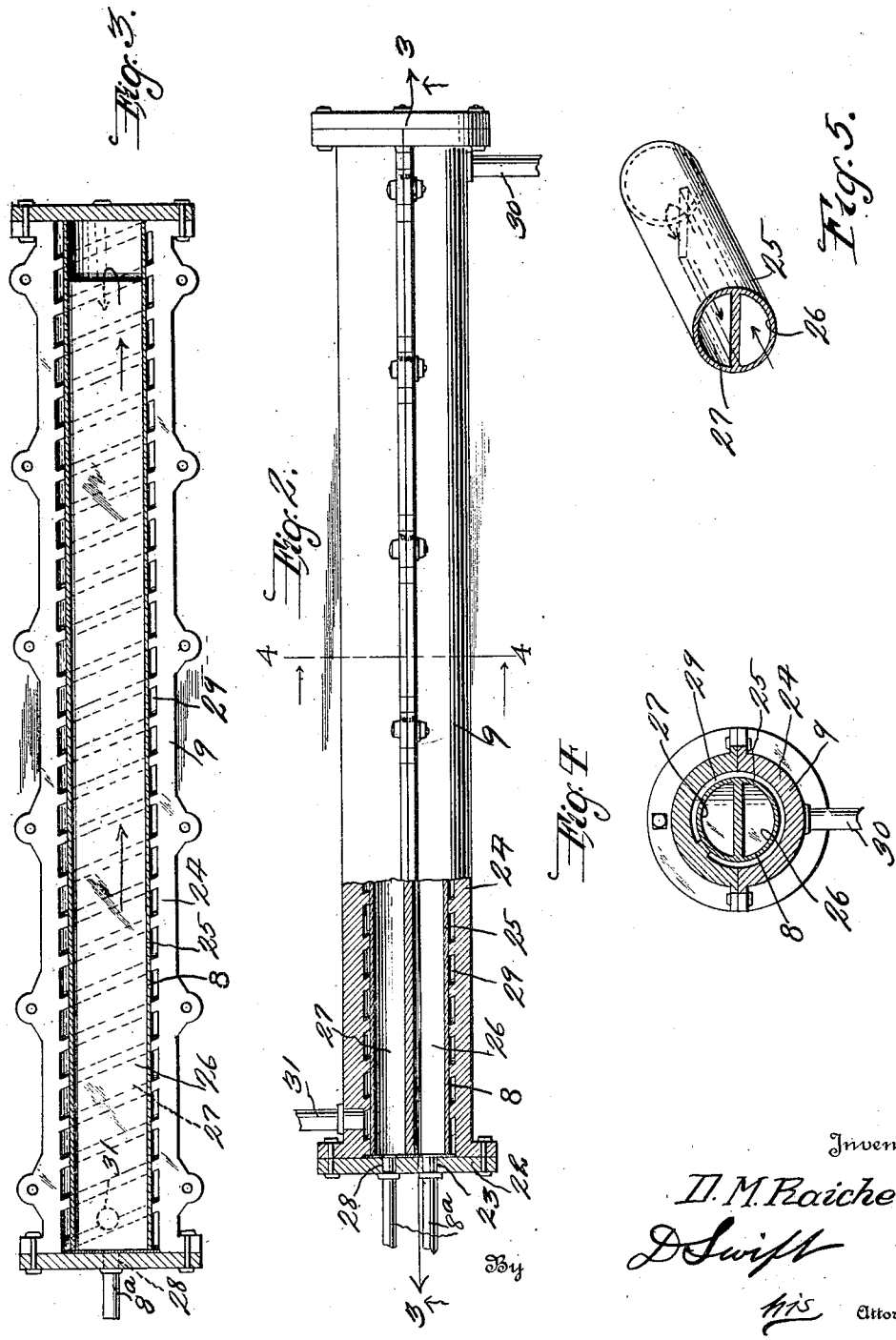

UNITED STATES PATENT OFFICE.

DENIS M. RAICHE, OF KANKAKEE, ILLINOIS.

HYDROTEMPERATURE-CONTROL SYSTEM FOR BATHS AND LAVING PURPOSES.

1,381,012.  Specification of Letters Patent.  Patented June 7, 1921.

Application filed April 29, 1920. Serial No. 377,679.

*To all whom it may concern:*

Be it known that I, DENIS M. RAICHE, a citizen of the United States, residing at Kankakee, in the county of Kankakee, State of Illinois, have invented a new and useful Hydrotemperature-Control System for Baths and Laving Purposes; and I do hereby declare the following to be a full, clear, and exact description of the invention, such as will enable others skilled in the art to which it appertains to make and use the same.

The invention relates to hydrotemperature control devices whereby a uniform temperature may be maintained at a predetermined degree and to provide means whereby said temperature may be varied substantially instantaneously, thereby providing a device particularly adapted for maintaining a uniform temperature of water and varying said temperature as desired. The device being particularly adapted in connection with baths used in hydrotherapeutic treatment, wherein the necessity of maintaining a uniform temperature and being able to vary said temperature as desired is essential.

A further object is to provide means whereby a constant flow of water will be passed into contact with the water heating element which flow may be controlled and to provide means whereby a minimum amount or minimum limit of water supply will be assured when the supply valve is cut off, thereby preventing an extremely high temperature of water to be supplied to the bath. By providing means for preventing the entire cutting off of the water supply, the danger of scalding is obviated. Therefore it is the object of the invention to provide a hydrotherapeutic continuous bath equipment that is proof against casualty while occupied by a mental patient, the device being particularly adapted for use in the treatment of insane persons who cannot be trusted to react and give the alarm. As a matter of fact in all cases where injury occurs, the mental patient deliberately remains in the water and makes no outcry.

It is a further object to provide a heat controlling system for heating and maintaining a uniform temperature to a flow of water of a predetermined volume by means of static column.

A further object is to provide a water tank in which water is heated by a steam coil which gets its supply from any source desired and to provide an upwardly extending static column in connection with said water heating tank. The static column is provided with a flow pipe, which flow pipe is in connection with a return pipe to the tank. The flow and return pipes have connected thereto the ends of a pipe which form a water heating element. The temperature of the water passing through the water heating element is regulated by the static column into which column the heat from the water heating tank rises until the water in the column is raised above a certain height which heat will vaporize, form a vacuum and automatically cause cold water to flow from a static tank.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings—

Figure 1 is a section through a building showing the device applied to a bath tub therein, parts being in section to illustrate the structure.

Fig. 2 is an enlarged side elevation of the water heating element partly in section.

Fig. 3 is a sectional view through the water heating element taken on line 3—3 of Fig. 2.

Fig. 4 is a sectional view taken on line 4—4 of Fig. 2.

Fig. 5 is a perspective view of a portion of copper heating pipe.

Fig. 6 is an enlarged front view of the temperature control valve.

Fig. 7 is a sectional view taken on line 7—7 of Fig. 6.

Fig. 8 is a sectional view taken on line 8—8 of Fig. 7.

Referring to the drawings, the numeral 1 designates a tank in which the water is heated by means of a steam coil 2. The supply of steam for the coil 2 may be obtained from any source desired. Secured to the tank 1 is an upwardly extending pipe 2ª, which forms a static column, which column is open at its upper end 3 and is provided with an overflow pipe 4, the purpose of which will presently appear. The maximum temperature that the water in the tank 1 can attain is limited by the height of the outlet 5 to the overflow pipe 4 above the heater 1. In other words if there is a static head of ten feet from the tank 1 to the outlet 5, the water can only reach a maximum temperature of about 224 degrees. At this point the water boils and the steam is discharged to the atmosphere through the end 3 of the pipe 2$^a$. The water heated in the heater $a$ passes upwardly into the pipe 2$^a$, thence into the flow pipe 6 and returns to the tank through the return pipe 7 after it has passed through the heating element 8, which heating element is disposed in the heater 9. The heating element 8 contains just enough square feet of heating surface so that when the water at 220 degrees flows through the pipe 8$^a$, it will heat a predetermined quantity a certain number of degrees, as for example, 60 gallons per hour from 60 degrees to 100 degrees. The pipe 2$^a$ has connected thereto as at 10, a pipe 11, in which pipe a check valve 12 is disposed. The other end of the pipe 11 is connected as at 13 to a tank 14, in which tank cold water is disposed and a uniform level maintained therein by means of a float valve 15 which controls the flow of water into the tank 14 from a supply pipe 16. The tank 14, is a closed tank and is provided with a vent 17, whereby air will be allowed to pass to the atmosphere incident to the variation of level of the water in the tank. The level of the water in the column formed by the pipe 2$^a$ is the same as the level of the water in the tank 14, therefore it will be seen that the excessive heat generated in the water heating tank 1 will, if said heat increases, cause the column of the water to be forced upwardly into the pipe 2$^a$ until the bottom of the water is above the point 10 at which time water will flow into the pipe 2$^a$ by the vacuum created by the condensed vapors within the pipe 2$^a$, from the tank 14, through the pipe 11 and check valve 12. This supply of cold water will lower the temperature of the water in the tank 1 to the maximum temperature of substantially 220 degrees and also lowers the temperature of the heating coil 2, which temperature of course varies according to the distance between the tank 1 and the overflow 5. The tank 1 is provided with a valve controlled drain pipe 18 so that the same may be drained as desired. An air vent pipe 19 has one of its ends connected to the heating pipe 8$^a$ as at 20 and its other end connected to the pipe 2$^a$ as at 21 so that air will be exhausted from the system and the possibility of the system becoming air bound obviated.

The pipe 8$^a$ which is a heating pipe has one of its ends connected to the heater casing head 22 as at 23, said heater casing head being bolted or otherwise secured to the heater casing 24 which casing is cylindrical and is preferably formed from a pair of semi-circular sections bolted together. Disposed within the casing 24 is a cylindrical copper pipe 25, into the passage 26 of which the heated water passes and returns to the return pipe 7 through the passage 27 of the cylindrical shaped copper pipe 25 and through the other end of the heating pipe 8$^a$ which is secured as at 28 to the casing head 22. The inner wall of the casing 24 is provided with a spiral groove 29, through which groove water is passed which enters the casing through the pipe 30 and passes through the groove in contact with the copper pipe 25 which heats the water as it passes through the groove 29 to the desired temperature. The water leaving the casing 24 through the pipe 31 which is connected as at 32 to a bath tub 33 in which the water is discharged. If so desired a recording thermometer 34 may be connected to the pipe 31 by means of a pipe 35, or if so desired it may be attached directly to the tub. The recording thermometer records the time of bath, the duration of the bath and the temperature on a chart.

The temperature of the water supplied to the tub 33 is regulated by the volume of water passed through the spiral groove 29 of the heater casing 24. This supply being controlled by a variable volume valve 30$^a$ to which the pipe 30 is connected. The variable volume valve 30$^a$ comprises a casing 36 having a cylindrical chamber 37, said cylindrical chamber being provided with an inlet port 38 at its upper end and outlet portion 39 at its lower end, there being a wall 40 within the chamber 37, which divides ports 38 and 39 so that they are not normally in communication with each other. Wall 40 is provided with a concentric slot 41 which is concentric with the shaft 42 of the valve disk 43. Valve disk 43 is provided with a concentric slot 44 which is adapted to be rotated into and out of registration with the concentric slot 41 in the wall 40 so that the amount of water entering the portion 38 and passing out through the port 39 may be regulated by turning of the handle member 45. The amount of flow will be indicated on a scale 46 with which scale a pointer 47 carried by the handle member 45 will coöperate, so as to indicate the amount of water passing through the concentric ports 41 and 44. A coiled spring 48 surrounds the shaft 42 and has one of its ends in contact with the disk 43, while its other end contacts with a cover 49 of the casing 36, thereby maintaining the disk in close contact with the wall 40 so as to prevent leakage. However it is desirable to provide means whereby the minimum amount of cold water allowed to pass through the pipe 30 will be limited so as to prevent scalding or the raising of the temprature to a dangerous point. To accomplish this object a by-pass 50 is provided, which by-pass communicates between the intake port 38 and the outlet port 39, said by-pass being provided with a plug or other form of valve 51, which may be set to allow of the passage to a predetermined amount of cold water to the casing 24 of the heating element casing 9. Thus it will be seen that means is provided whereby it will be impossible for the water to rise above a predetermined temperature. Water enters the control valve 30ª through the pipe 52 which may have its other end connected to the supply tank 14, or if so desired to any other source of supply. A port is made in the valve so that the cold water may be by-passed directly to pipe 30, avoiding radiator or heating element, thereby combining the possibility of obtaining either hot, warm or cold water from the one valve and with variations in temperature practically instantaneous as desired.

The tub is of a conventional form and is provided with an overflow pipe 53 and a drain pipe 54, so that as the water is supplied to the tub at a uniform temperature and continuously, the level within the tub will be maintained at a uniform height.

From the above it will be seen that by manipulating the variable volume valve 30ª, that the amount of water passing over the copper heating pipes may be increased or decreased so that the temperature of the water entering the tube 33 may be maintained at a predetermined uniform temperature, said temperature being recorded on the time chart of the recording thermometer 34. It has been found that a uniform temperature can be maintained in the device continuously, the variation in temperature being absolutely under the control of the operator at all times, also instantaneously changeable at the option of the operator.

The tank 14 is provided with an overflow pipe 14ª for additionally insuring a constant level of water within the tank 14.

The invention having been set forth what is claimed as new and useful is:—

1. A device for heating and maintaining at a constant temperature a continuous flow of water, said device comprising a casing, through which the water flows, a pipe disposed in said casing, said pipe having its ends in communication with a water heating tank, means for heating the water in the water heating tank, a static column rising upwardly from the water heating tank, a pipe connecting to the cold water supply tank and the static column below the overflow thereof, a check valve in said connecting pipe, means for maintaining a constant level of water in the tank and in the column for maintaining a predetermined water temperature in the water heating tank, said column forming means whereby as excess heat is generated in the column the water therein will be forced upwardly through the overflow creating a vacuum in the column which opens the check valve, thereby permitting cold water to flow from the water tank and into the water heating tank.

2. A device for heating and maintaining at a constant temperature a continuous flow of water, said device comprising a casing having spiral grooves through which the water flows, a pipe disposed in said casing, said pipe having its ends in communication with a flow and return pipe of a water heating tank, means for continuously heating the water in said water heating tank, a static column rising upwardly from the flow pipe of the water heating tank, the upper end of said pipe being provided with an overflow port, said port being so positioned that the column of water therein normally registers therewith, a supply tank connected to the column at a point below the overflow port, a check valve interposed between the supply tank and the column and forming means whereby as the column is forced upwardly through the overflow port, cold water will flow from the supply tank into the column and water heating tank for reducing the temperature of the water in the water heating tank and means whereby a constant level of water will be maintained in the water supply tank and the column.

In testimony whereof I have signed my name to this specification in the presence of two subscribing witnesses.

DENIS M. RAICHE.

Witnesses:
WILLIAM A. SPEICHER,
CECILE FAFORD.